United States Patent [19]

Speranza et al.

[11] Patent Number: 5,093,382
[45] Date of Patent: Mar. 3, 1992

[54] PREPARATION OF FOAMS USING POLYFUNCTIONAL ORGANIC ACIDS

[75] Inventors: George P. Speranza, Austin; Donald H. Champion, Pflugerville, both of Tex.

[73] Assignee: Texaco Chemical Company, White Plains, N.Y.

[21] Appl. No.: 741,917

[22] Filed: Aug. 8, 1991

[51] Int. Cl.⁵ .............................................. C08G 18/00
[52] U.S. Cl. ............................................... 521/157
[58] Field of Search .................................... 521/157

[56] References Cited

U.S. PATENT DOCUMENTS 4,868,277 9/1989 Chen ........................... 528/272

Primary Examiner—Morton Foelak
Attorney, Agent, or Firm—Jack H. Park; Kenneth R. Priem; Carl G. Ries

[57] ABSTRACT

Foamed reaction products of organic polyisocyanates containing an average of at least 2 isocyanate groups per molecule with equivalent weights of carbon dioxide-generating, carboxyl group terminated addition reaction products of a polyoxyalkylene polyamine or polyoxyalkylene polyol reactant with a polycarboxylic acid reactant, the polyoxyalkylamine and polyoxyalkyl polyol reactant having an average molecular weight of about 200 to about 5,000 and being selected from the group consisting of polyoxypropylene diamines, polyoxypropylene/oxyethylene diamines, poly(oxytetramethylene) diamines and polyoxypropylene triamines, polyoxypropylene diols, polyoxypropylene/oxyethylene diols, poly(oxytetramethylene) diols and polyoxypropylene triols, the polycarboxylic acid reactant containing 2 to about 45 carbon atoms and being selected from the group consisting of aromatic and aliphatic dicarboxylic acids and anhydrides thereof.

31 Claims, No Drawings

PREPARATION OF FOAMS USING POLYFUNCTIONAL ORGANIC ACIDS

BACKGROUND OF THE INVENTION

1. Technical Field of the Invention

This invention relates to foams containing amide groups prepared from organic polyisocyanates and polyfunctional organic acids. More particularly, this invention relates to the preparation of foamed reaction products that contain amide groups, the foamed reaction products being prepared by reacting an organic polyisocyanate with an addition reaction product of a polyoxyalkylene reactant with an organic polycarboxylic acid reactant; such addition reaction product containing terminal carboxylic acid groups and being referred to herein as a polyoxyalkylene derivative of an organic polycarboxylic acid containing terminal carboxylic acid groups.

2. Prior Art

It is known to prepare polyurethane foams by the reaction of an organic polyisocyanate with a polyoxypropylene polyol using an extraneous blowing agent such as a fluorinated hydrocarbon. However, fluorinated hydrocarbons create environmental problems when released to the atmosphere.

It is known to prepare polyurethane foam using carbon dioxide generated by the reaction of an organic polyisocyanate with water. The disadvantage here is that fluorinated hydrocarbon blowing agents are needed to make most polyurethane foams.

The preparation of polyurethane foam and the general background relating to the reaction of acids and isocyanates is discussed in the well-known text by Saunders and Frisch, "Polyurethanes Chemistry and Technology in High Performance Polymers", *Interscience:* New York, 1962; Vol. XVI, Part I.

Lichtenberg also describes the use of water and formic acid as blowing agents in preparing polyurethane foam (Lichtenberg, F. W., Ed. "CFC's and the Polyurethane Industry"; SPI, Vol. 2).

U.S. Pat. No. 4,868,277 is directed toward making nonelastomeric thermoplastic polyesteramides. Important differences between U.S. Pat. No. 4,868,277 and the present invention are primarily the materials described in U.S. Pat. No. 4,868,277 are not foams. The acids used to cap the polymer diols in U.S. Pat. No. 4,868,277 have from 6 to 14 carbons. Difunctional isocyanates and acids provide linear polymers in U.S. Pat. No. 4,868,277, hence their thermoplastic nature. The carboxyl terminated polymers employed in U.S. Pat. No. 4,868,277 are derived from dicarboxylic acids and polymeric diols. Materials with a higher functionality than 2 are not used. A large molar amount of short chain diacid as compared with the carboxyl terminated prepolymer in 4,868,277 as well (>10:1). A solvent is used which is not possible in the present invention unless it would also serve as an auxiliary blowing agent and would not be used per se as a solvent for the reaction medium.

EP 194,058 is directed to catalyzing the reaction of polycarboxylic acids and diisocyanates by using alkali metal salts (basic salts) in solvent consisting of N,N'-dimethyl alkylene urea alone or with cosolvent. This method is inherently not useful for making foams because of the solvent; the carbon dioxide evolved escapes and is not used to form bubbles. The suggested uses appear to preclude foams. The use of carboxylate terminated polyether esters or amides is not suggested (as the carboxylic acid component). All examples are directed to formation of aromatic polyamides.

BACKGROUND OF THE PRESENT INVENTION

The provision of a gas, such as carbon dioxide, during the preparation of a polyurethane foam presents a number of problems because a proper amount of the gas must be provided at the proper time in order to induce foaming during the gelation stage and before the cross linking of the polyurethane is complete.

One of the components frequently used in the preparation of a polyurethane foam is a polyoxypropylene polyol. A wide variety of polyoxypropylene polyols have been proposed for use in this service. However, the polyoxypropylene polyols proposed in the past have not had the capacity for reacting with organic polyisocyanates to release carbon dioxide during the gelation and cross linking stages involved in the preparation of polyurethane foam.

A solution to these and related problems is found in the provision of the process of the present invention and the products resulting therefrom wherein an organic polyisocyanate is reacted with a carbon dioxide-generating, polyoxyalkylene derivative of an organic polycarboxylic acid containing terminal carboxylic acid groups.

DETAILED DESCRIPTION

The foam reaction products of the present invention contain amide groups and may also contain urea groups and/or mixed anhydride groups and may be described as foamed reaction products of an organic polyisocyanate containing an average of at least 2 isocyanate groups per molecule with an equivalent weight of a carbon dioxide-generating, polyoxyalkylene derivative of an organic polycarboxylic acid containing terminal carboxylic acid groups. The polyoxyalkylene derivative is prepared by reacting an organic polycarboxylic acid with a polyoxyalkylene reactant such as a polyoxyalkylene diol, a polyoxyalkylene triol, or a polyoxyalkylene diamine, or a polyoxyalkylene triamine, in the ratio of about one mole of organic polycarboxylic acid for each terminal hydroxyl or terminal amine group contained in the polyoxyalkylene reactant. The polyoxyalkylene reactant should have an average molecular weight of about 200 to about 5,000. The polyoxyalkylene compound should be derived from propylene oxide, ethylene oxide, butylene oxide and tetrahydrofuran or mixtures thereof. The organic polycarboxylic acid reactant should contain 2 to about 45 carbon atoms and is selected from the group consisting of aromatic and aliphatic polycarboxylic acids and anhydrides thereof.

The polyoxyalkylene derivatives of organic dicarboxylic acids that are used in the practice of the present invention can be represented, generally, by the formula:

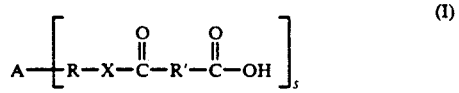

(I)

wherein
s represents 2 or 3,

A represents the nucleus of an oxyalkylation susceptible dihydric or trihydric alcohol containing about 3 to about 6 carbon atoms, X represents —O—, —NH—, or N—R" where R" is $C_1$ to $C_4$ alkyl group, R' represents an aliphatic or an aromatic group containing 2 to 42 carbon atoms and having an average molecular weight of 26 to 700, and R represents an oxyalkylene group from the class consisting of polyoxypropylene groups, poly(oxytetramethylene) groups, polyoxypropylene/oxyethylene groups and $\alpha,\omega$-bis(3-propylene)polytetrahydrofuran groups, a) said polyoxypropylene groups having the formula:

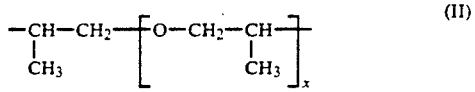

wherein x is a positive number having an average value of about 1 to about 60, b) said polyoxypropylene/oxyethylene groups having the formula:

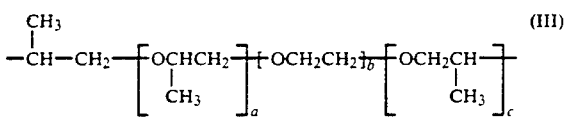

c) said poly(oxytetramethylene) groups having the formula:

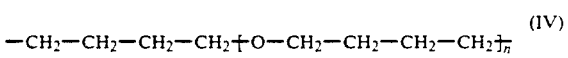

wherein n is a positive number having an average value of 1 to about 50, d) said $\alpha,\omega$-bis(3-propylene) polytetrahydrofuran groups having the formula:

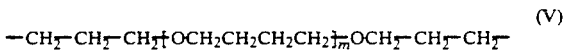

wherein m is a positive number having a value of 1 to 15.

When the polyoxyalkylene compound is a diol, a diamine or an aminoalcohol, the polyoxyalkylene derivative of the organic dicarboxylic acid and the difunctional polyoxyalkylene compound may be represented by the formula:

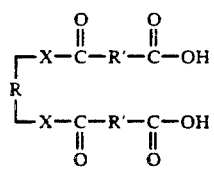

wherein:

X represents —NH— or —O—, and

R' represents a difunctional hydrocarbon group derived from the dicarboxylic acid and R represents a polyoxyalkylene group derived from the polyoxyalkylene diamine or polyoxyalkylene diol.

When the organic dicarboxylic acid is reacted with a polyoxyalkylene triol or a polyoxyalkylene triamine, the resultant polyoxyalkylene derivative may be represented by the formula:

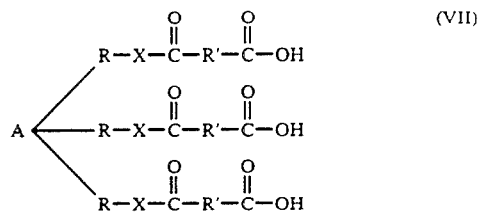

wherein A, X, R and R' have the meaning given above in formula I.

In accordance with a preferred method of the present invention, a foam is prepared by reacting (1) an organic polyisocyanate with an equivalent weight of (2) a carbon dioxide-generating addition reaction product of (a) an aromatic or aliphatic polycarboxylic acid reactant or an anhydride thereof and (b) a molar excess of a polyoxyalkylene polyamine reactant sufficient to provide an addition product terminated substantially completely with carboxyl groups, the polyoxyalkylene polyamine reactant being selected from the group consisting of polyoxypropylene diamines, poly(oxytetramethylene) diamines, polyoxypropylene/oxyethylene diamines, $\alpha,\omega$-bis(3-aminopropyl) polytetrahydrofuran and polyoxypropylene triamines.

More particularly, the polyoxypropylene diamine may be a polyoxypropylene diamine having the formula:

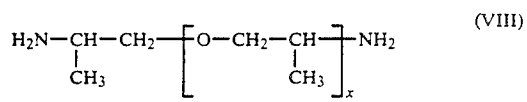

wherein x is a positive number having an average value of about 2 to about 60.

As another example, a polyoxypropylene/oxyethylene diamine may be used such as one having the formula:

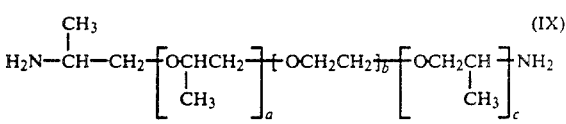

wherein a+c equals a positive number having a value of from 2 to about 10 and b is a positive number having a value of from 1 to about 50.

A poly(oxytetramethylene) diamine may also be used such as one having the formula:

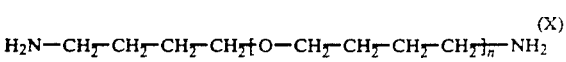

wherein n is a positive number having an average value of 1 to about 50.

An $\alpha,\omega$-bis(3-aminopropyl) polytetrahydrofuran may be used, such as one having the formula:

(XI)

wherein m is a positive number having a value of 5 to 15.

A polyoxypropylene triamine may also be used such as one having the formula:

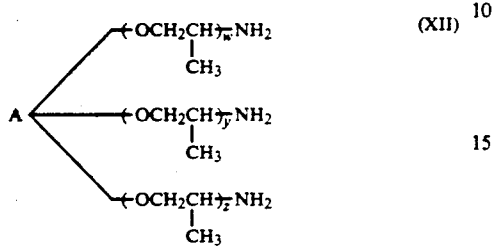
(XII)

wherein A represents the nucleus of an oxyalkylation susceptible trihydric alcohol containing about 3 to about 6 carbon atoms, w, y and z are positive numbers and the average value of the sum of w+y+z is from about 4 to about 100.

In accordance with another preferred method of the present invention, a foam is prepared by reacting (1) an organic polyisocyanate with an equivalent weight of (2) a carbon dioxide-generating addition reaction product of (a) an aromatic or aliphatic polycarboxylic acid reactant or an anhydride thereof and (b) a molar excess of a polyoxyalkylene polyol reactant sufficient to provide an addition product terminated substantially completely with carboxyl groups, the polyoxyalkylene polyol reactant being selected from the group consisting of polyoxypropylene diols, poly(oxytetramethylene) diols, polyoxypropylene/oxyethylene diols and polyoxypropylene triols.

More particularly, the polyoxypropylene diol may be a polyoxypropylene diol having the formula:

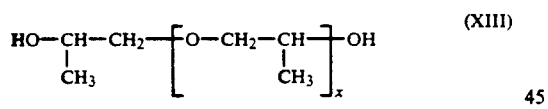
(XIII)

wherein x is a positive number having an average value of about 2 to about 60.

As another example, a polyoxypropylene/oxyethylene diamine may be used such as one having the formula:

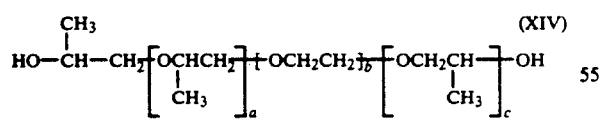
(XIV)

wherein a+c equals a positive number having a value of from 2 to about 10 and b is a positive number having a value of from 1 to about 50.

A poly(oxytetramethylene) diol may also be used such as one having the formula:

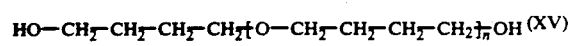
(XV)

wherein n is a positive number having an average value of 1 to about 50.

A polyoxypropylene triol may also be used such as one having the formula:

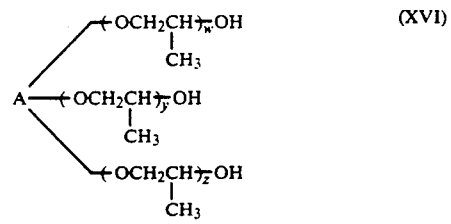
(XVI)

wherein A represents the nucleus of an oxyalkylation susceptible trihydric alcohol containing about 3 to about 6 carbon atoms, w, y and z are positive numbers and the average value of the sum of w+y+z is from about 4 to about 100.

Manufacture of Polymer Foams

The carboxyl group terminated polyoxyalkylene polyamine and polyoxyalkylene polyol addition products of the present invention provide both the flexible block and the blowing agent that are necessary for the production of foams. The foams of the present invention contain functional groups between the polyether segments and the isocyanate segments which result from the reaction of isocyanate groups with carboxylic acid groups, including amide groups, urea groups and anhydride groups together with the carbon dioxide that is liberated by the reactions:

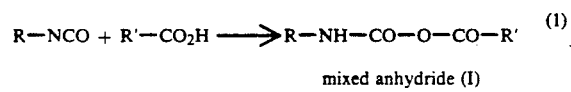

mixed anhydride (I)

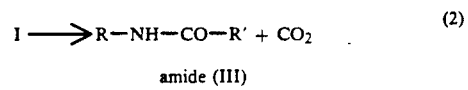

amide (III)

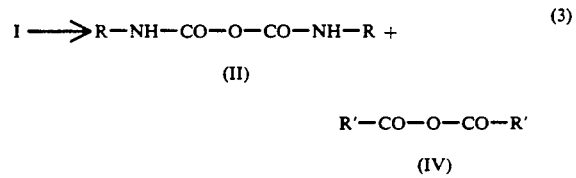

(II)

$$R'-CO-O-CO-R'$$

(IV)

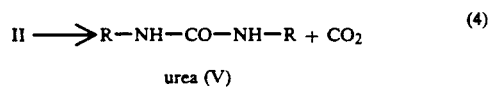

urea (V)

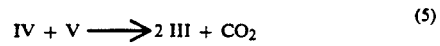

In equation 3, two moles of I are formally needed for the reaction to be balanced but this may not be representative of the actual reaction path. Reaction 5 may take place at about 160° C.

The components used in the manufacture of the foams of the present invention include an organic polyisocyanate, a catalyst system and the acid terminated polyamides or polyesters of the present invention which may be used alone or in mixture with conventional polyoxypropylene polyols or polyester polyols. A foam stabilizer may also be added. Other conventional additives such as fire retardants, dyes, fillers, etc., may also be included in the formulation.

Typical aromatic polyisocyanates that may be used in the practice of the present invention include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl) methane, bis(3-methyl-4-isocyanatophenyl) methane, and 4,4'-diphenyl propane diisocyanate.

Preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines an corresponding methylene-bridged polyphenyl polyisocyanates therefrom are described in the literature and in many patents, for example, U.S. Pat. Nos. 2,683,730; 2,950,263; 3,012,008; 3,344,162; and 3,362,979.

The more preferred methylene-bridged polyphenyl polyisocyanate mixtures used here contain from about 20 to about 100 wt. % methylene diphenyl diisocyanate isomers with the remainder being polymethylene polyphenyl diisocyanates having higher functionalities and higher molecular weights. Typical of these are polyphenyl polyisocyanate mixtures containing about 20 to 100 wt. % methylene diphenyl diisocyanate isomers, of which 20 to about 95 wt. % thereof is the 4,4'-isomer with the remainder being polymethylene polyphenyl polyisocyanates of higher molecular weight and functionality that have an average functionality of from about 2.1 to about 3.5. The isocyanate mixtures are known materials and can be prepared, for example, by the process described in U.S. Pat. No. 3,362,979, issued Jan. 9, 1968 to Floyd E. Bentley.

The catalysts which may be used to make the foams are well known. There are two general types of catalyst, tertiary amines and organo-metallic compounds. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in my invention are triethylenediamine, tetramethylethylenediamine, triethylamine, tripropylamine, tributylamine, triamylamine, pyridine, quinoline, dimethylpiperazine, dimethylhexahydroaniline, diethylpiperazine, N-ethylmorpholine, dimethylaniline, nicotine,dimethylaminoethanol,tetramethylpropanediamine, and methyltriethylenediamine. Organo-metallic compounds useful as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. Selection of the individual catalysts and proportions to use in the polyurethane reaction are well within the knowledge of those skilled in the art, and an amine and organo-metallic compound are often used together in the polyurethane reaction.

Conventional formulation ingredients are also employed, such as, for example, foam stabilizers also known as silicone oils or emulsifiers. The foam stabilizer may be an organic silane or siloxane. For example, compounds may be used having the formula:

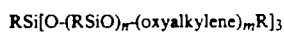

$$RSi[O-(RSiO)_n-(oxyalkylene)_mR]_3 \qquad (XVII)$$

wherein R is an alkyl group containing from 1 to 4 carbon atoms; n is an integer of from 4 to 8; m is an integer of 20 to 40; and the oxyalkylene groups are derived from propylene oxide and ethylene oxide. See, for example, U.S. Pat. No. 3,194,773.

The flame retardancy of the polyurethane composition can be enhanced by using known fire retardants. Examples of suitable flame retardants are: tris(1,3-dichloropropyl) phosphate, tris(2,3-dibromopropyl)-phosphate, 2,2-bis(chloromethyl)-1,3 propylene bis[di(2-chloroethyl)phosphate], tris(2-chloroethyl)phosphate, tris(2-chloropropyl)phosphate, bis(dichloropropyl)tribromopentyl phosphate, tetrakis-(2-chloroethyl)ethylene diphosphate (sold by Olin Chemicals as THERMOLIN®101), FYROL® EFF (oligomeric chloroalkyl phosphate, sold by Stauffer Chemical Co.), tricresyl phosphate, cresyl diphenyl phosphate, chlorinated paraffins, and brominated paraffins. Halogenated phosphates are preferred flame retardants in the practice of this invention, such as tris(1,3-dichloropropyl)-phosphate, tris(2-chloro-ethyl)phosphate, FYROL® EFF, and tetrakis(2-chloroethyl)ethylene disphosphate. Although a single flame retardant is preferred from the standpoint of simplicity of formulation, mixtures of two or more of the same type or of different types may be found to give improved performance in some cases, and such mixtures are included in the scope of this invention. The amount of flame retardant can be varied over a wide range of from about 20 to about 60 parts by weight per 100 parts by weight of polyol in the reaction mixture. It is preferred to use from about 20 to about 40 parts by weight.

As indicated, the addition products to be reacted with organic polyisocyanates in accordance with the present invention are polyoxyalkylene polyester or polyamide derivatives of an organic polycarboxylic acid, such derivatives containing terminal carboxylic acid groups.

Polyoxyalkylene Polyamine Starting Materials

The polyoxyalkylene polyamine starting materials for the present invention include polyoxypropylene diamines, polyoxypropylene triamines polyoxyethylene/oxypropylene diamines containing both ethylene oxide and propylene oxide, polytetrahydrofuran diamines and α,ω-bis(3-aminopropyl) tetrahydrofuran.

One group of appropriate polyoxypropylene diamines that can be used are those that are sold by the Texaco Chemical Company as Jeffamine® D-series products having the formula:

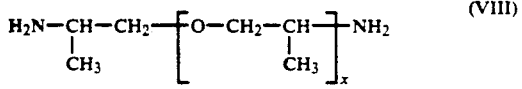

wherein x is a positive number having an average value of about 2 to about 60.

Representative products include a polyoxypropylene diamine having an average molecular weight of about 230 wherein the value of x is 2.6 (Jeffamine ® D-230 amine), a polyoxypropylene diamine having an average molecular weight of about 400 wherein x has a value of 5.6 (Jeffamine ® D-400 amine), a polyoxypropylene diamine product having an average molecular weight of about 2,000 wherein x has a value of about 33 (Jeffamine ® D-2000 amine) and a product having an average molecular weight of about 4,000 wherein x has a value of about 60 (Jeffamine ® D-4005 amine).

It is necessary to express x as an average number because, as pointed out above, the addition of ethylene oxide and/or propylene oxide proceeds randomly, and the addition will conform to a Gaussian distribution curve.

For example, if 1 mole of propylene glycol is reacted with 4 moles of ethylene oxide, under ethyoxylaton reaction conditions, the reaction, in theory, will proceed as follows:

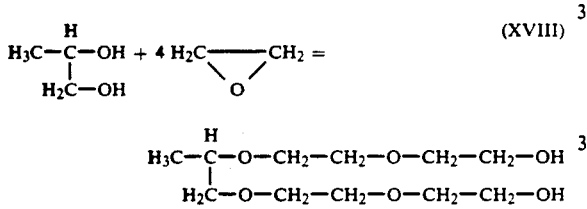

In this situation, R will equal

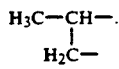

Since the addition of the ethylene oxide proceeds randomly, in conformance with a Gaussian distribution curve, in this example, some of the alkoxylation molecules will contain more than 4 moles of ethylene oxide and some will contain less than 4 moles of ethylene oxide.

The polyol formed by the ethoxylation and/or propoxylation of the divalent or trivalent aliphatic alcohol is reductively aminated, as explained above, to provide the polyoxyethylene/oxypropylene or polyoxypropylene diamine or triamine starting materials of the present invention.

Another appropriate class of polyoxyalkylene diamines that may be used are diamines containing both ethylene oxide and propylene oxide that are sold by the Texaco Chemical Company as Jeffamine ® ED-series products having the formula:

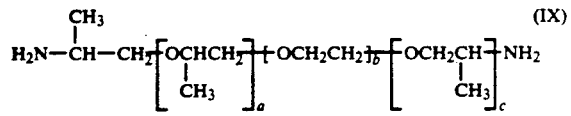

wherein a+c equals a positive number having a value of from 2 to about 10 and b is a positive number having a value of from about 1 to about 50.

Examples of products having this general formula include a commercial product having an average molecular weight of about 600 where the value of b is about 8.5 and the value of a+c is about 2.5 (Jeffamine ® ED-600), a commercial product having an average molecular weight of about 900 wherein the value of a+c is again about 2.5, but the value of b is about 15.5 (Jeffamine ® ED-900). Other examples are those wherein a+c has a value of about 2.5 including a product having an average molecular weight of about 2,000 wherein the value of b is about 40 (Jeffamine ® ED-2001) and a product having an average molecular weight of about 4,000 wherein the value of b is about 85 (Jeffamine ® ED-4000).

An example of appropriate polyoxypropylene triamines that may be used as a starting material for the present invention include triamines sold by Texaco Chemical Company as Jeffamine ® T-series products having the formula:

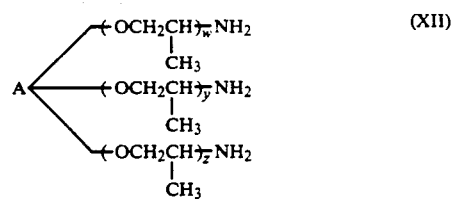

wherein A represents a trivalent hydrocarbon group consisting of 3 to 6 carbon atoms, resulting from the propoxylation of a propoxylation susceptible aliphatic trihydric alcohol containing 3 to 6 carbon atoms, w, y, and z are positive numbers and the average value of the sum of w+y+z is from about 4 to about 100.

Examples of such products include a commercial product having an average molecular weight of about 400 sold by the Texaco Chemical Company under the tradename Jeffamine ® T-403 wherein A represents a trimethylol propane nucleus, and the product contains an average of about 5.3 oxypropylene groups, a product having an average molecular weight of about 3,000 sold by the Texaco Chemical Company under the tradename Jeffamine ® T-3000 wherein A represents a trimethyol propane nucleus and the product contains about 50 oxypropylene groups and a product having an average molecular weight of about 5,000 sold by the Texaco Chemical Company under the tradename Jeffamine ® T 5000 wherein A represents a gylcerol nucleus and the product contains about 86 oxypropylene groups.

For example, Jeffamine ® T-403 and Jeffamine ® T-3000 will have the formula:

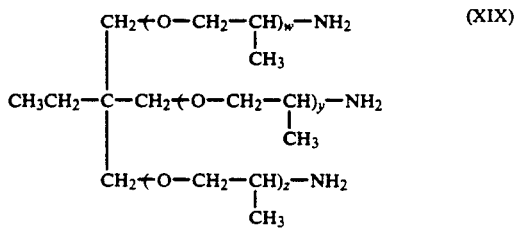

wherein, for Jeffamine ® T-403, the sum of w+y+z will be about 5.3 and for Jeffamine ® T-3000, the sum of w+y+z will be about 50. The addition of propylene oxide is random; the molecules of the propoxylation product follow a Gaussian distribution pattern. A molecule wherein w and y equal 1 and z equals 98 will not be formed.

It is to be observed that in the above-written formula for Jeffamine ® T-403 and Jeffamine ® T-3000, the 6 carbon atom trivalent hydrocarbon group resulting from the propoxylation of trimethylolpropane will be:

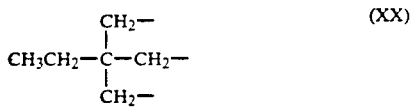

(XX)

Another group of materials that may be used are the poly(oxytetramethylene) diamines having the formula:

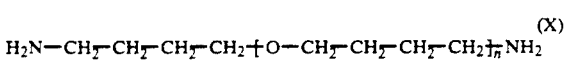

(X)

wherein n is a positive number having an average value of 1 to about 50.

Such products can be prepared, for example, by the reductive amination of poly(oxytetramethylene) glycols in the presence of ammonia and hydrogen and a hydrogenation catalyst such as a nickel, copper, chromium, molybdenum catalyst using the process, for example, as disclosed in Larkin and Zimmerman U.S. Pat. No. 5,003,107.

For example, the reductive amination reaction can be conducted utilizing a catalyst containing from about 70 to 78 wt. % of nickel, about 20 to 25 wt. % of copper, about 0.5 to about 3 wt. % of chromium and about 1 to about 3 wt. % of molybdenum. The reductive amination reaction is suitably conducted at a temperature within the range of about 150° to about 220° C. and a pressure of about 100 to 10,000 psig., such as a pressure of 100 to about 3,000 psig. The reductive amination is suitably conducted in the presence of ammonia, such as from about 1 to about 300 moles of ammonia per mole of poly(oxytetramethylene) qlycol and also in the presence of added hydrogen. The amount of added hydrogen used may suitably be from about 0.1 to about 10 mol. % of the poly(oxytetramethylene) glycol.

A further group of materials that may be used are the α,ω-bis(3-aminopropyl) polytetrahydrofuran diamines having the formula:

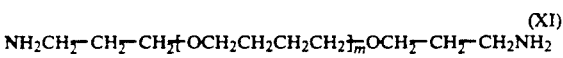

(XI)

wherein m is a positive number having a value of 1 to 15.

Polyoxyalkylene Polyol Starting Materials

The polyoxyalkylene polyol starting materials for the present invention include polyoxypropylene diols, polyoxypropylene diols and polyoxyethylene/oxypropylene diols containing both ethylene oxide and propylene oxide.

One group of appropriate polyoxypropylene diols that can be used are those having the formula:

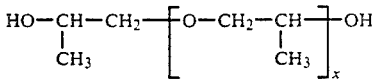

(XIII)

wherein x is a number having an average value of about 2 to about 60.

Representative products include a polyoxypropylene diol having an average molecular weight of about 230 wherein the value of x is 2.6, a polyoxypropylene diol having an average molecular weight of about 400 wherein x has a value of 5.6, a polyoxypropylene diol product having an average molecular weight of about 2,000 wherein x has a value of about 33 and a product having an average molecular weight of about 4,000 wherein x has a value of about 60.

Another appropriate class of polyoxyalkylene diols that may be used are diols containing both ethylene oxide and propylene oxide having the formula:

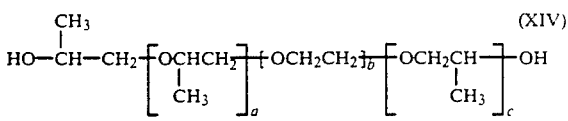

(XIV)

wherein a+c equals a positive number having a value of from about 2 to about 10 and b is a positive number having a value of from about 1 to about 50.

Examples of products having this general formula include a product having an average molecular weight of about 600 where the value of b is about 8.5 and the value of a+c is about 2.5, a product having an average molecular weight of about 900 wherein the value of a+c is again about 2.5, but the value of b is about 15.5. Other examples are those wherein a+c has a value of about 2.5 including a product having an average molecular weight of about 2,000 wherein the value of b is about 40 and a product having an average molecular weight of about 4,000 wherein the value of b is about 85.

An example of appropriate polyoxypropylene triols that may be used as a starting material for the present invention include triol products having the formula:

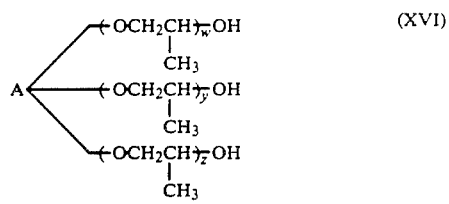

(XVI)

wherein A represents a trivalent hydrocarbon group consisting of 3 to 6 carbon atoms, resulting from the propoxylation of a propoxylation susceptible aliphatic trihydric alcohol containing 3 to 6 carbon atoms, w, y and z are positive numbers and the average value of the sum of w+y+z is from about 4 to about 100.

Examples of such products include a product having an average molecular weight of about 400 wherein A represents a trimethylol propane nucleus, and the product contains an average of about 5.3 oxypropylene groups, a product having an average molecular weight of about 3,000 wherein A represents a trimethylol propane nucleus and the product contains about 50 oxypropylene groups and a product having an average molecular weight of about 5,000 wherein A represents a glycerol nucleus and the product contains about 86 oxypropylene groups.

For example, the products based on trimethylol propane will have the formula:

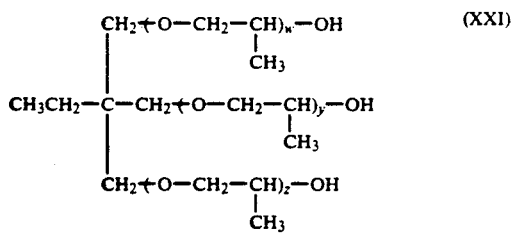

wherein the sum of w+y+z will be about 5.3 and for the 400 molecular weight product, the sum of w+y+z will be about 50. The addition of propylene oxide is random; the molecules of the propoxylation product follow a Gaussian distribution pattern. A molecule wherein w and y equal 1 and z equals 98 will not be formed.

Another group of materials that may be used are the poly(oxytetramethylene) diols having the formula:

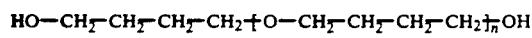

wherein n is a positive number having an average value of 1 to about 50.

For example, the poly(oxytetramethylene) diol, more commonly referred to as a polytetrahydrofuran, may be one having an average molecular weight of about 1000.

The Polycarboxylic Acid Starting Material

Useful polycarboxylic acid starting materials for the present invention include di- and tricarboxylic acids or anhydrides thereof. The dicarboxylic acid starting material may be any suitable aliphatic or aromatic dicarboxylic acid or an anhydride thereof, such dicarboxylic acid containing from about 4 to about 44 carbon atoms, having an average molecular weight of 416 to about 800 and having the formula:

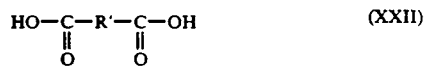

wherein R' represents an aliphatic or an aromatic group containing 2 to 42 carbon atoms and having an average molecular weight of 26 to about 700.

Examples of suitable aliphatic dicarboxylic acids that may be used include adipic acid, dodecanedioic acid, glutaric acid, maleic anhydride, fumaric acid, azelaic acid, sebacic acid, the so-called "dimer acids" prepared by the dimerization of unsaturated monocarboxylic acids such as oleic acid, linoleic acid, eleostearic acid, and mixtures thereof which are sold commercially as "tall oil fatty acids".

The dimer acids are conventionally prepared by the thermal polymerizaton (with or without a catalyst) of saturated, ethylenically unsaturated, or acetylenically unsaturated monocarboxylic acids containing 8 to 24 carbon atoms with monocarboxylic acids having 16 to 20 carbon atoms being preferred. Thus, the dimer acids will normally contain from about 24 to 44 carbon atoms. It can be calculated that the butyl ester of a dimer acid containing 44 carbon atoms will have a molecular weight of about 800. Dimer acids are, for the most part, a variety of substituted cyclohexenedicarboxylic acids from by a Diels-Alder reaction.

A particularly useful discussion of the type of polymer fatty acids employed herein is contained in "The Dimer Acids," E. Leonard editor, published by the Humko Sheffield Chemical Company in Connecticut.

Other suitable dicarboxylic acids that may be used include brassylic acid, octadecanedioic acid, thapsic acid and dodecanedioic acid.

Examples of aromatic polycarboxylic acid that may be used as starting materials for the present invention include acids such as terephthalic acid, isophthalic acid, trimesic acid, 1,1,3-trimethyl-3-phenylidan-4',5-dicarboxylic acid, 2,6-naphthalene dicarboxylic acid, t-butyl isophthalic acid, etc. (i.e., benzene dicarboxylic acids and tricarboxylic acids, hemimellitic acid, trimellitic acid, 2-phenyl pentanedioic acid, etc.).

When a tri or higher carboxylic acid (or derivative) where at least two carboxylate groups are on adjacent carbons (such as trimellitic anhydride) is reacted with a polyoxyalkylene polyamine to provide the polyoxyalkylene derivative of a polycarboxylic acid, the possibility of inside formation is possible. Such a compound can be depicted by the formula wherein A, X, R and R' have the meaning given above in formula I.

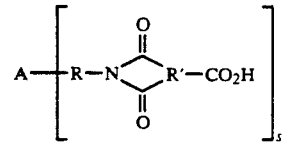

Preparation of the Addition Reaction Product

In accordance with one preferred embodiment of the present invention, a polyoxyalkylene derivative of an organic polycarboxylic acid containing terminal carboxylic acid groups is prepared by the non-catalytic reaction of a polyoxyalkylene polyamine containing terminal amine groups (as herein defined) with an aromatic or aliphatic polycarboxylic acid or an anhydride thereof in an amount sufficient to provide for the reaction of one mole of the polycarboxylic acid reactant with each terminal primary amine group of the polyoxyalkylene polyamine so as to provide an intermediate condensation product containing only terminal carboxyl groups. The reaction may be conducted non-catalytically or catalytically at a temperature within the range of about 150° to about 250° C. for a reaction time within the range of about 0.5 to 12 hours. Normally, the reaction will go to completion after a reaction time within the range of 2 to about 6 hours.

By-product water of reaction is preferably removed from the reaction mixture as it is formed. The reacton is complete when essentially all of the amine groups of the polyoxyalkylene polyamine have reacted with carboxyl groups of the dicarboxylic acid reactant. Under the noncatalytic conditions employed herein, the polyoxyalkylene polyamine groups are essentially unreactive with each other.

The intermediate condensation products that are formed in accordance with the present invention are liquid or amorphous solids containing terminal carboxylic acid groups.

In accordance with another preferred embodiment of the present invention, a polyoxyalkylene derivative of an organic polycarboxylic acid containing terminal carboxylic acid groups is prepared by the reaction of a polyoxyalkylene polyol containing terminal hydroxyl groups (as herein defined) is reacted with an aromatic or aliphatic polycarboxylic acid or an anhydride thereof in an amount sufficient to provide for the reaction of one mole of the polycarboxylic acid reactant with each terminal hydroxyl group of the polyoxyalkylene polyhydroxyl compound so as to provide an intermediate condensation product containing only terminal carboxyl groups. The reaction is suitably conducted at a temperature within the range of about 150° to about 250° C. for a reaction time within the range of about 0.5 to 12 hours. Normally, the reaction will go to completion after a reaction time within the range of 2 to about 6 hours. Catalyst may be required for less reactive carboxylic acids. Standard esterification catalyst known by those skilled in the art include sulfuric, phosphoric, p-toluenesulfuric and sulfurated organic resins.

SPECIFIC EXAMPLES

These compounds are produced from polycarboxylic acids or polycarboxylic acid anhydrides and polyetheramines by the procedure put forth in U.S. Pat. No. 4,239,635 or alternatively, without the use of solvent at temperatures of about 210°-235° C. to drive off the water produced when dicarboxylic acids are used. A description of the acid terminated polyetheramides is given below:

Product A was prepared from JEFFAMINE® D-400 diamine and adipic acid (½ mole ratio);

Product B from JEFFAMINE® D-230 diamine and adipic acid (½ mole ratio);

Product C from JEFFAMINE® ED-2001 diamine and EMPOL® 1010 dimerized fatty acid from Emery, hereafter referred to a dimer acid (½ mole ratio);

Product D from JEFFAMINE® T-403 triamine and dimer acid (⅓ mole ratio);

Product E from JEFFAMINE® T-3000 triamine and dimer acid (⅓ mole ratio);

Product F from JEFFAMINE® D-2000 diamine and trimellitic anhydride (½ mole ratio);

Product G from JEFFAMINE® T-3000 triamine and adipic acid (⅓ mole ratio);

Product H from JEFFAMINE® D-2000 diamine and adipic acid (½ mole ratio);

Product I from α,ω-bis(3-aminopropyl)polytetrahydrofuran, molecular weight about 750, and adipic acid (½ mole ratio);

Product J from JEFFAMINE® T-403 triamine and adipic acid (⅓ mole ratio);

Product K from aminated polytetrahydrofuran, molecular weight about 1000, and adipic acid (½ mole ratio);

Product L from N,N'-diisopropyl tetraethylene glycol diamine and maleic anhydride (½ mole ratio);

Product M from N,N'-diisopropyl tetraethylene glycol diamine and succinic anhydride (½ mole ratio);

Product N from N,N'-diisopropyl tetraethylene glycol diamine and adipic acid (½ mole ratio);

Product O from JEFFAMINE® T-3000 triamine and isophthalic acid (⅓ mole ratio).

Analyses of the products are given below. The equivalent weight for the reaction of these products with isocyanate was calculated by summing acid, amine and hydroxyl (if determined) group concentrations.

| Product | Acid meq/g | Amine meq/g | Acetylatables meq/g | Equivalent Weight |
|---|---|---|---|---|
| A | 3.20 | 0.006 | 0.37 | 280 |
| B | 3.90 | 0.043 | | 254 |
| C | 0.66 | <0.01 | | 1515 |
| D | 1.34 | 0.03 | | 746 |
| E | 0.68 | <0.01 | | 1471 |
| F | 0.803 | 0.006 | | 1245 |
| G | 0.89 | 0.02 | | 1128 |
| H | 0.919 | | | 1088 |
| I | 1.74 | 0.021 | | 568 |
| J | 3.64 | 0.043 | | 272 |
| K | 1.40 | 0.015 | | 707 |
| L | 4.07 | 3.60 | | 130 |
| M | 4.79 | 0.82 | | 178 |
| N | 2.05 | 0.36 | | 415 |
| O | 0.81 | 0.027 | | 1195 |

From the analyses it is apparent that reaction was incomplete in product L and substantially complete in products M and N.

EXAMPLE 1

Product A (5.60 g, 20.0 meq) preheated to 80° C. and RUBINATE® M, polymeric MDI from ICI, equivalent weight 134, (2.68 g, 20.0 meq) were hand mixed in a 50 cc beaker. A slow reaction occurred to give a stringy mixture after 18 minutes and a small, weak foam on standing for 3 h. On heating in an 80° C. oven for one hour, a larger soft and resilient foam was obtained.

Repeating the procedure but adding various standard polyurethane catalysts (2-3 drops) gave substantially the same results. The volume of the foams ranged up to about 100 cc.

Several reactions were similarly carried out with the other acids and RUBINATE® M polyisocyanate except that the mixtures were heated at 80° C. just after mixing. Some of the polyetheramide acids were heated in an 80° C. oven before reaction to obtain workable liquids.

The results are given in Table I.

TABLE I

| | | | | |
|---|---|---|---|---|
| Foams from Acid Terminated Polyetheramides and Polymeric MDI | | | | |
| Ex. | Acid | Amount g | RUBINATE® M g | Results |
| 2 | B | 4.57 | 2.41 | about 120 cc resilient, shrinking foam |
| 3 | C | 6.44 | 0.57 | 25 cc weak, sticky foam |
| 4[a] | D | 5.93 | 1.07 | 25 cc weak, tacky foam |
| 5 | E | 6.47 | 0.59 | 25 cc resilient, tacky foam |
| 6 | F | 6.35 | 0.68 | 20 cc foamed cream, stirrable |
| 7 | G | 6.20 | 0.74 | 25 cc tacky foam |
| 8[a] | H | 6.26 | 0.77 | 20 cc soft, tacky, weak foam |
| 9[a] | I | 5.68 | 1.34 | about 70 cc soft, shrinking foam |
| 10 | J | 4.76 | 2.35 | about 100 cc resilient foam |
| 11 | K | 5.90 | 1.12 | 55 cc soft, weak foam |
| 12 | O | 6.27 | 0.70 | 15 cc sticky foam |
| 13[a] | H | 1.63 | 1.94 | about 70 cc smooth skinned foam |
| | J | 3.54 | | |
| 14 | I | 2.64 | 1.87 | about 75 cc foam similar to Example 12 |
| | J | 2.53 | | |

[a]Additionally added 2 drops DC-193.

EXAMPLE 15

A mixture of 4.61 g (3.00 meq) JEFFAMINE® T-5000 triamine and 1.46 g (20.0 meq) adipic acid was heated to 80° C. in a 50 cc beaker. Upon cooling somewhat, 0.10 g 33% TEDA in dipropylene glycol (TD-33A) and 0.10 g L-711 surfactant were mixed followed by addition 3.08 g (23.0 meq) RUBINATE® M polyisocyanate. After stirring, the resulting mixture was heated for 1 h in an 80° C. oven to give a soft foam with a volume of about 60 cc.

EXAMPLE 16

To a mixture of 4.26 g (15.0 meq) dimer acid, 0.79 g (5.0 meq) JEFFAMINE® T-403 triamine, 2 drops TD-33A and 2 drops L-711 surfactant was added 2.68 g (20.0 meq) RUBINATE® M polyisocyanate. A mildly exothermic reaction took place resulting in an increased viscosity. The mixture could not be hand stirred after about one minute. After the mixture was heated for 1 h in an 80° C. oven, a compact, weak, sticky foam was obtained.

Examples 15 and 16 illustrate that foams can be made without prereacting the acid and the polyetharamine component. However, adipic acid is hard to handle in the system because it is a solid. The foams obtained from these examples were also less attractive than those obtained in the previous examples.

EXAMPLE 17

A mixture of 4.99 g (175 meq) dimer acid and 2.35 g (175 meq) RUBINATE® M polyisocyanate was hand mixed and placed in an 80° C. oven for one hour. Slight bubbling occurred but the material did not solidify. Repeating the procedure additionally employing 2 drops TD-33A gave 20 cc of material which collapsed on poking.

Example 17 illustrated that dimer acid alone does not give a foam under these conditions.

EXAMPLES 18 and 19

Two larger scale runs were carried out substantially as in Example 1 additionally using TD-33A catalyst and a surfactant. The acid terminated polyetheramide (preheated to 80° C.), catalyst and surfactant were premixed in a large paper cup followed by the addition of RUBINATE® M polyisocyanate. The resulting mixture was placed in an 80° C. oven for 1 h to give foam which was cut into a rectangular solid in order to weigh and calculate its density. Results are as follows:

|  | Example 18 | Example 19 |
| --- | --- | --- |
| Acid A, g | 33.6 | 40.9 |
| TD33-A, g | 0.50 | 0.60 |
| L-711, g | 0.50 | — |
| DC-193, g | — | 0.60 |
| RUBINATE® M, g | 16.1 | 19.5 |
| original density, lbs/ft³ | 3.2 | 2.4 |
| properties | soft, fine celled severly shrinks | stiff, reticulated shrinks somewhat |

EXAMPLES 20-22

Reactions were carried out as in Example 1 except that 2 drops of DC-193 was mixed into the acid component before the isocyanate. Foaming occurred before heating the mixture and post heating was carried out for 15 minutes at 80° C. giving the results in Table II.

TABLE II

Foams from Polymeric MDI and Acid Terminated Amides Derived from N,N',-Diisopropyl Tetraethylene Glycol Diamine

| Ex. | Acid | Amount g | RUBINATE® M g | Results |
| --- | --- | --- | --- | --- |
| 20 | L | 3.45 | 3.55 | about 130 cc light, friable foam |
| 21 | M | 4.01 | 3.02 | about 70 cc foam |
| 22 | N | 5.31 | 1.72 | about 80 cc soft, firm, shrinking foam |

EXAMPLE 23

Acid A, 5.32 g (10.0 meq), and 2 drops DC-193 were mixed. Then 1.65 g (19.0 meq) toluene diisocyanate (TDI) was mixed in. After heating in an 80° C. oven for 1 h, about 75 cc of weak, irregular foam was obtained. The center of the foam was void.

EXAMPLE 24

As in Example 23, 5.30 g (19.5 meq) acid J, 2 drops DC-193 and 1.72 g (19.5 meq) TDI was reacted to give about 65 cc of a weak, brittle and irregular foam.

EXAMPLES 25-28

A mixed ethyleneoxy/propyleneoxy (ca. 9 mole % ethyleneoxy) triol of average molecular weight 3000 and adipic acid were reacted in a 1 to 3 mole ratio in the presence of NAFION® 520 supported superacid catalyst at about 210° C. to give an acid terminated polyetherester. Analysis of the product gave 0.81 meq/g acid and 0.24 meq/g hydroxyl. (Equivalent weight 952 by acid+hydroxyl.)

The triol was heated to 80° C. and foaming experiment were carried out as in Example 1 excepting that 2 drops of TD-33A, 2 drops of DC-193 and in some cases an auxiliary blowing agent was initially mixed with the acid before the addition of the isocyanate. The results are listed in Table III.

TABLE III

Foams from Polymeric MDI and Acid Capped Polyetherester

| Ex. | Acid g | Water g | Formic Acid g | RUBINATE® M g | Results |
| --- | --- | --- | --- | --- | --- |
| 23 | 6.19 |  |  | 0.87 | 20 cc soft, somewhat resilient foam |
| 24 | 6.19 | 0.140 |  | 2.95 | 80 cc firm, resilient foam |
| 25 | 6.19 |  | 0.208 | 2.08 | 80 cc soft, weak foam-permanently flattened with applied pressure |
| 26ᵃ | 5.77 |  |  | 1.23 | 30 cc resilient foam |
| 27 | 5.77 | 0.147 |  | 3.39 | ca. 120 cc soft, resilient foam |
| 28 | 5.77 |  | 0.30 | 2.95 | ca. 150 cc soft, weak foam-does not permanently flatten with applied pressure |

ᵃDC-193 not added.

EXAMPLE 29

Maleic anhydride and polypropylene glycol, average molecular weight 400, were reacted in a 2/1 mole ratio at about 135° C. to give an acid terminated polyetherester. Analysis of the product gave 3.61 meq/g acid.

A mixture of 4.50 g of the acid heated to 80° C., 2 drops TD-33A and 2 drops DC-193A were mixed. After the addition of 2.48 g RUBINATE ® M polyisocyanate and mixing, foaming occurred within about one minute. The mixture was further cured in an 80° C. oven for one hour to give a soft, fairly resilient and shrinking foam of ca. 110 cc original volume. However, there was a large void space in the center of the foam.

EXAMPLE 30

A mixed ethyleneoxy/propyleneoxy (ca. 9 mole % ethyleneoxy) triol of average molecular weight 3000 and trimellitic anhydride were reacted in a 1 to 3 mole ratio by gradual heating to 210° C. The product gave 2.03 meq/g acid.

The procedure of Example 31 was followed by reacting 5.12 g of the acid and 1.88 g RUBINATE ® M polyisocyanate in the presence of two drops TD-33A. The mixture foamed only slightly and did not fully cure even after heating at 80° C. for one hours.

EXAMPLE 31

A mixture of 4.90 g (17.5 meq) Acid A at 80° C., two drops DC-193, two drops T-10, 50% stannous octoate catalyst, and 2.14 g (17.5 meq) m-tetramethylxylylenediisocyanate (TMXDI) was prepared in a 50 cc beaker and placed in an oven at 80° C. for one hour and 100° C. for one hour. The mixture remained liquid.

EXAMPLE 32

Example 31 was repeated using 4.76 g (meq) Acid A, two drops T-10, two drops DC-193 and 2.23 g (17.0 meq) HYLENE ® W, methylenebis-(cyclohexylisocyanate). Heating was carried out in the same manner but in this case foaming occurred to give a weak foam above a large void region. Liquid material was present at the bottom of the beaker.

EXAMPLE 33

Example 31 was repeated by first mixing 4.76 g (17.5 meq) Acid J at 80° C., two drops T-10 and two drops DC-193. Then 2.29 g (17.5 meq) HYLENE ® W was added. The mixture was heated in an 80° C. oven for about 5 minutes then remixed. On curing for one hour in an 80° C. oven, about 70 cc of a weak, brittle foam was obtained.

Having thus described our invention, what is claimed is:

1. A foamed reaction product of an organic polyisocyanate containing an average of about two isocyanate groups per molecule with an equivalent weight of a carbon dioxide-generating carboxy polyoxyalkylene amine addition reaction product of a polyoxyalkylene polyamine reactant with an organic polycarboxylic acid reactant, said polyoxyalkylene polyamine reactant having an average molecular weight of about 200 to about 5,000 and being selected from the group consisting of polyoxypropylene diamines, poly(oxytetramethylene) diamines, polyoxypropylene/oxyethylene diamines, and polyoxypropylene triamines, said polycarboxylic acid reactant containing 2 to about 45 carbon atoms and being selected from the group consisting of aromatic and aliphatic polycarboxylic acids and anhydrides thereof.

2. A foamed polyurethane reaction product as in claim 1 wherein the polycarboxylic acid reactant is an aliphatic dicarboxylic acid containing from 2 to about 45 carbon atoms and having an average molecular weight of 90 to about 700, or an anhydride thereof.

3. A foamed reaction product as in claim 2 wherein the polyoxyalkylene polyamine reactant is a polyoxypropylene diamine having the formula:

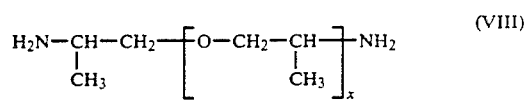

wherein x is a positive number having an average value of about 1 to about 60.

4. A foamed reaction product as in claim 3 wherein the dicarboxylic acid reactant is adipic acid.

5. A foamed reaction product as in claim 2 wherein the polyoxyalkylene polyamine reactant is a polyoxyethylene/oxypropylenepropylene diamine having the formula:

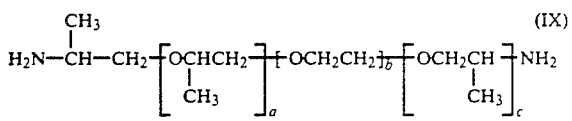

wherein a+c equals a positive number having a value of from 1 to about 10 with the proviso that c is at least 1, and b is a positive number having a value of from 1 to about 50.

6. A foamed reaction product as in claim 5 wherein the dicarboxylic acid reactant is adipic acid.

7. A foamed reaction product as in claim 2 wherein the polyoxyalkylene polyamine reactant is a poly(oxytetramethylene) diamine having the formula:

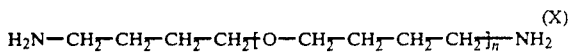

wherein n is a positive number having an average value of 1 to about 50.

8. A foamed reaction product as in claim 7 wherein the dicarboxylic acid reactant is adipic acid.

9. A foamed reaction product as in claim 2 wherein the aliphatic dicarboxylic acid reactant is adipic acid and the polyoxyalkylene polyamine reactant is N,N'-diisopropyl triethylene glycol diamine.

10. A foamed reaction product as in claim 2 wherein the aliphatic dicarboxylic acid reactant is maleic anhydride and the polyoxyalkylene polyamine reactant is N,N'-diisopropyl tetraethylene glycol diamine.

11. A foamed reaction product as in claim 2 wherein the aliphatic dicarboxylic acid reactant is succinic anhydride and the polyoxyalkylene polyamine reactant is N,N'-diisopropyl triethylene glyco diamine.

12. A foamed reaction product as in claim 2 wherein the aliphatic dicarboxylic acid reactant is a dimer fatty acid and the polyoxyalkylene polyamine reactant is a polyoxyethylene/oxypropylenepropylene diamine having the formula:

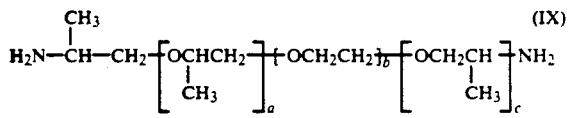

wherein a+c equals a positive number having a value of from 1 to about 10 with the proviso that c is at least 1, and b is a positive number having a value of from 1 to about 50.

13. A foamed reaction product as in claim 2 wherein the polyoxyalkylene polyamine reactant is a triamine having the formula:

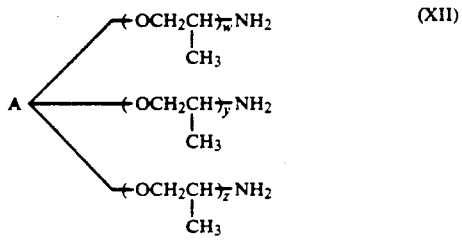

wherein A represents the nucleus of an oxyalkylation susceptible trihydric alcohol containing about 3 to about 6 carbon atoms, w, y and z are positive numbers and the average value of the sum of w+y+z is from about 4 to about 100.

14. A foamed reaction product as in claim 13 wherein the dicarboxylic acid reactant is adipic acid.

15. A foamed reaction product as in claim 13 wherein the dicarboxylic acid reactant is a dimer fatty acid.

16. A foamed reaction product as in claim 1 wherein the dicarboxylic acid reactant is an aromatic polycarboxylic acid containing from 2 to about 42 carbon atoms and having an average molecular weight of 98 to about 700, or an anhydride thereof.

17. A foamed reaction product as in claim 16 wherein the polycarboxylic acid reactant is trimellitic anhydride and the polyoxyalkylene polyamine reactant is a polyoxypropylene diamine having the formula:

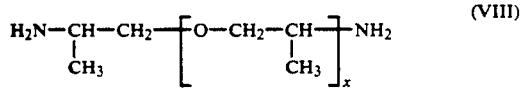

wherein x is a number having an average value of about 1 to about 60.

18. A method for preparing a foam which comprises reacting an organic polyisocyanate with an equivalent weight of a carbon dioxide-generating addition reaction product of a molar excess of an aromatic or aliphatic polycarboxylic acid, reactant or an anhydride thereof and a polyoxyalkylene polyamine reactant sufficient to provide an addition product terminated substantially completely with carboxyl groups, (a) said polyoxyalkylene polyamine being selected from the group consisting of polyoxypropylene diamines, poly(oxytetramethylene) diamines, polyoxypropylene/oxyethylene diamines, and polyoxypropylene triamines, (b) said polyoxypropylene diamines having the formula:

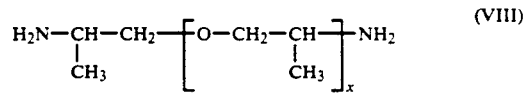

wherein x is a positive number having an average value of about 1 to about 60, (c) said polyoxypropylene/oxyethylene diamines having the formula:

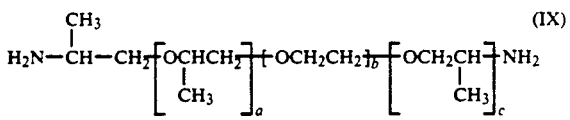

wherein a+c equals a positive number having a value of from 1 to about 10 with the proviso that c is at least 1, and b is a positive number having a value of from 1 to about 50, (d) said polyoxypropylene triamine having the formula:

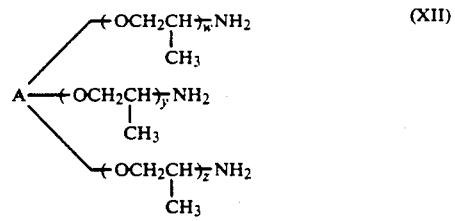

wherein A represents the nucleus Of an oxyalkylation susceptible trihydric alcohol containing about 3 to about 6 carbon atoms, w, y and z are positive numbers and the average value of the sum of w+y+z is from about 4 to about 100, and (e) said poly(oxytetramethylene) diamine having the formula:

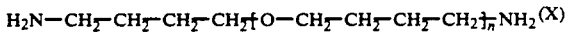

wherein n is a positive number having an average value of 1 to about 50.

19. A method as in claim 18 wherein the polycarboxylic acid reactant is adipic acid.

20. A method as in claim 18 wherein the polyoxyalkylene polyamine reactant is a polyoxypropylene diamine having the formula:

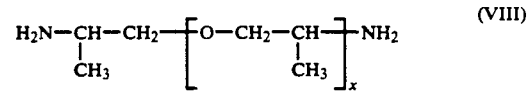

wherein x is a positive number having an average value of about 1 to about 60.

21. A foamed reaction product of an organic polyisocyanate containing an average of at least two isocyanate groups per molecule with an equivalent weight of a carbon dioxide-generating an addition reaction product of a polyoxyalkylene polyol reactant with an organic polycarboxylic acid reactant, said polyoxyalkylene polyamine reactant having an average molecular weight of about 200 to about 5,000 and being selected from the group consisting of polyoxypropylene diols, poly(oxytetramethylene) diols, polyoxypropylene/oxyethylene diols, and polyoxypropylene/oxyethylene triols and polyoxypropylene triols, said polycarboxylic acid reactant containing 2 to about 45 carbon atoms and being selected from the group consisting of aromatic and aliphatic polycarboxylic acids and anhydrides thereof.

22. A foamed reaction product as in claim 21 wherein the polyoxyalkylene polyol reactant is a polyoxypropylene diol having the formula:

$$HO-CH(CH_3)-CH_2-[O-CH_2-CH(CH_3)]_x-OH \quad (XIII)$$

wherein x is a positive number having an average value of about 1 to about 60.

23. A foamed reaction product as in claim 21 wherein the polyoxyalkylene diol reactant is a polyoxyethylene/oxypropylenepropylene diol having the formula:

$$HO-CH(CH_3)-CH_2-[OCHCH_2(CH_3)]_a-[OCH_2CH_2]_b-[OCH_2CH(CH_3)]_c-OH \quad (XIV)$$

wherein a+c equals a positive number having a value of from 1 to about 10 with the proviso that c is at least 1, and b is a positive number having a value of from 1 to about 50.

24. A foamed reaction product as in claim 21 wherein the polyoxyalkylene diol reactant is a poly(oxytetramethylene) diol having the formula:

$$HO-CH_2-CH_2-CH_2-CH_2-[O-CH_2-CH_2-CH_2-CH_2]_n-OH \quad (XV)$$

wherein n is a positive number having an average value of 1 to about 50.

25. A foamed reaction product as in claim 21 wherein the polyoxyalkylene polyol reactant is a triol having the formula:

$$A\begin{cases}-(OCH_2CH(CH_3))_w-OH \\ -(OCH_2CH(CH_3))_y-OH \\ -(OCH_2CH(CH_3))_z-OH\end{cases} \quad (XVI)$$

wherein A represents the nucleus of an oxyalkylation susceptible trihydric alcohol containing about 3 to about 6 carbon atoms, w, y and z are positive numbers and the average value of the sum of w+y+z is from about 4 to about 100.

26. A method for preparing a foam which comprises reacting an organic polyisocyanate with an equivalent weight of a carbon dioxide-generating addition reaction product of a molar excess of an aromatic or aliphatic polycarboxylic acid, reactant or an anhydride thereof and a polyoxyalkylene polyol reactant sufficient to provide an addition product terminated substantially completely with carboxyl groups, (a) said polyoxyalkylene polyol being selected from the group consisting of polyoxypropylene diols, poly(oxytetramethylene) diols, polyoxypropylene/oxyethylene diols, polyoxypropylene/oxyethylene triols and polyoxypropylene triols, (b) said polyoxypropylene diols having the formula:

$$HO-CH(CH_3)-CH_2-[O-CH_2-CH(CH_3)]_x-OH \quad (XIII)$$

wherein x is a positive number having an average value of about 1 to about 60, (c) said polyoxypropylene/oxyethylene diols having the formula:

$$HO-CH(CH_3)-CH_2-[OCHCH_2(CH_3)]_a-[OCH_2CH_2]_b-[OCH_2CH(CH_3)]_c-OH \quad (XIV)$$

wherein a+c equals a positive number having a value of from 1 to about 10 with the proviso that c is at least 1, and b is a positive number having a value of from 1 to about 50, (d) said polyoxypropylene triol having the formula:

$$A\begin{cases}-(OCH_2CH(CH_3))_w-OH \\ -(OCH_2CH(CH_3))_y-OH \\ -(OCH_2CH(CH_3))_z-OH\end{cases} \quad (XVI)$$

wherein A represents the nucleus of an oxyalkylation susceptible trihydric alcohol containing about 3 to about 6 carbon atoms, w, y and z are positive numbers and the average value of the sum of w+y+z is from about 4 to about 100, and (e) said poly(oxytetramethylene) diol having the formula:

$$HO-CH_2-CH_2-CH_2-CH_2-[O-CH_2-CH_2-CH_2-CH_2]_n-OH \quad (XV)$$

wherein n is a positive number having an average value of 1 to about 50.

27. A method as in claim 26 wherein the polyoxyalkylene diol reactant is a polyoxypropylene diol having the formula:

$$HO-CH(CH_3)-CH_2-[O-CH_2-CH(CH_3)]_x-OH \quad (XIII)$$

wherein x is a positive number having an average value of about 1 to about 60.

28. A foamed reaction product as in claim 1 wherein the polycarboxylic acid reactant is adipic acid.

29. A foamed reaction product as in claim 1 wherein the polycarboxylic acid reactant is a dimer fatty acid.

30. A foamed reaction product as in claim 1 wherein the polycarboxylic acid reactant is an aromatic polycarboxylic acid containing from 2 to about 42 carbon atoms and having an average molecular weight of 98 to about 700, or an anhydride thereof.

31. A foamed reaction product as in claim 1 wherein the polycarboxylic acid reactant is trimelittic anhydride and the polyoxyalkylene diol reactant is a polyoxypropylene diol having the formula:

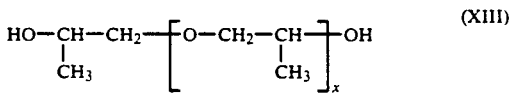

(XIII)

wherein x is a positive number having an average value of about 1 to about 60.

* * * * *